(12) United States Patent
Raveendran et al.

(10) Patent No.: US 11,047,402 B2
(45) Date of Patent: Jun. 29, 2021

(54) ELECTRICALLY CONTROLLABLE HYDRAULIC SYSTEM FOR A VEHICLE TRANSMISSION AND METHOD FOR CONTROLLING THE SAME

(71) Applicant: Punch Powertrain N.V., Sint-Truiden (BE)

(72) Inventors: Rekha Kandiyil Raveendran, Holsbeek (BE); Timotheus Franciscus Adrianus Van Els, Echt-Susteren (NL)

(73) Assignee: Punch Powertrain N.V., Sint-Truiden (BE)

( * ) Notice: Subject to any disclaimer, the term of this patent is extended or adjusted under 35 U.S.C. 154(b) by 0 days.

(21) Appl. No.: 16/639,952

(22) PCT Filed: Aug. 17, 2018

(86) PCT No.: PCT/EP2018/072364
§ 371 (c)(1),
(2) Date: Feb. 18, 2020

(87) PCT Pub. No.: WO2019/034790
PCT Pub. Date: Feb. 21, 2019

(65) Prior Publication Data
US 2020/0248727 A1    Aug. 6, 2020

(30) Foreign Application Priority Data
Aug. 18, 2017    (BE) .................................. 2017/5570

(51) Int. Cl.
*F15B 15/20* (2006.01)
*F16H 61/00* (2006.01)
*F16H 61/02* (2006.01)

(52) U.S. Cl.
CPC ......... *F15B 15/20* (2013.01); *F16H 61/0021* (2013.01); *F16H 61/0251* (2013.01); *F15B 2211/505* (2013.01)

(58) Field of Classification Search
CPC ................ F15B 13/043; F15B 13/0431; F15B 2211/427; F15B 2211/527; F16H 61/0021; F16H 61/0251; F16H 2061/0255
See application file for complete search history.

(56) References Cited

U.S. PATENT DOCUMENTS

| 4,437,385 A | * | 3/1984 | Kramer | F15B 11/006 91/361 |
| 4,796,853 A | * | 1/1989 | Butts | F16H 61/0206 251/129.05 |

(Continued)

FOREIGN PATENT DOCUMENTS

| CN | 2010-57264 Y | 5/2008 |
| CN | 101713683 A | 5/2010 |

(Continued)

OTHER PUBLICATIONS

International Search Report & Written Opinion of the International Searching Authority dated Oct. 25, 2018 issued in corresponding International Application No. PCT/EP2018/072364 (10 pgs.).

(Continued)

*Primary Examiner* — F Daniel Lopez
*Assistant Examiner* — Matthew Wiblin
(74) *Attorney, Agent, or Firm* — Pillsbury Winthrop Shaw Pittman, LLP

(57) ABSTRACT

Electrically controllable hydraulic system for a vehicle transmission and method for controlling the same An electrically controllable hydraulic system (1) for a vehicle transmission comprises a pressure pump system (4a, 4b) and a subsystem (1A) comprising a transmission element (2) and an electrically controlled hydraulic pressure controlling module (1B) including a hydraulic valve element (15) for controlling a hydraulic pressure for actuating the transmission element (2) and an electromagnetically controllable operating element (21) for operating the hydraulic valve element (15). The subsystem (1A) and the pressure controlling module (1B) have a first and a second cut-off frequency (f1, f2) with f2>f1. The hydraulic system includes a driver circuit (32) for driving the pressure controlling module (1B) that comprises a full bridge circuit and a control circuit (42) for simultaneously controlling both switching elements of (Continued)

the driver circuit with a duty cycle according to an input value of the input signal (Iset) dithered with a frequency ($f_{dith}$) in the range (f1, f2).

20 Claims, 6 Drawing Sheets

(56) References Cited

U.S. PATENT DOCUMENTS

| | | | |
|---|---|---|---|
| 5,556,356 A * | 9/1996 | Hakamada | F16H 61/0206 477/130 |
| 6,023,988 A | 2/2000 | McKee et al. | |
| 2005/0107213 A1* | 5/2005 | Kim | F16H 61/0021 477/158 |
| 2010/0087999 A1 | 4/2010 | Neelakantan et al. | |
| 2010/0137093 A1* | 6/2010 | Collins | F16H 61/0006 475/127 |

FOREIGN PATENT DOCUMENTS

| | | |
|---|---|---|
| CN | 102777592 A | 11/2012 |
| CN | 103423442 A | 12/2013 |
| CN | 103574023 A | 2/2014 |
| JP | 2012-021629 A | 2/2012 |

OTHER PUBLICATIONS

First Office Action dated Mar. 18, 2021, issued in corresponding Chinese Patent Application No. 2018800666803, with English translation (8 pgs.).

* cited by examiner

ELECTRICALLY CONTROLLABLE HYDRAULIC SYSTEM FOR A VEHICLE TRANSMISSION AND METHOD FOR CONTROLLING THE SAME

CROSS-REFERENCE TO RELATED APPLICATIONS

This is the U.S. National Stage of PCT/EP2018/072364, filed Aug. 17, 2018, which claims priority to Belgium Application No. 2017/5570, filed Aug. 18, 2017, the contents of each of which is incorporated herein by reference in its entirety.

BACKGROUND

The present invention pertains to an electrically controllable hydraulic system for a vehicle transmission.

The present invention further pertains to a method of electrically controlling a hydraulic system for a vehicle transmission.

A vehicle transmission for coupling and transmitting engine power to wheels of the vehicle may comprise a plurality of transmission elements, e.g., clutch elements and torque control elements that need to be controllably actuated within a continuous actuation range. Another example of a transmission element is a friction element that serves to clamp a flexible element like a chain or a belt in a variable transmission system. In an electrically controlled hydraulic system for a vehicle transmission the transmission elements are actuated by a hydraulic pressure which is controlled by electrically controlled hydraulic pressure controlling modules comprising a hydraulic valve element and an electromagnetically controllable operating element, such as a solenoid, for operating the hydraulic valve element. In practice a controlled continuous actuation may be complicated by friction occurring in these elements. In particular small changes in actuations may be difficult to achieve in that a change in hydraulic force required to achieve a small change may not be sufficient to outweigh a static friction within a pressure controlling module. An overshoot easily occurs once the electromagnetic force is strong enough to overcome the static friction.

A known way to address this complication is to add a low-frequency component, also denoted as dither, that causes the pressure controlling module to oscillate in accordance with the frequency of this dither component, therewith attenuating the effect of static friction within the pressure controlling module.

An example of an electronic controller having a hysteric drive mode providing a dither signal is the MC33816: SD6 Programmable Driver for Solenoid Control available from NXP.

The controller is arranged to independently control a respective one pair of switching elements arranged in a bridge circuit driving the load. In a first operational mode both switching elements are conductive to drive the load from the power supply terminals Vboost and Ground. In a second operational mode only a first one of the switching elements is conductive, so that a freewheel current occurs through the first conductive switching element and the freewheel diode attached to the same power supply terminal as the first conductive switching element. In a third operational mode only a second one of the switching elements is conductive, so that a freewheel current occurs through the second conductive switching element and the freewheel diode attached to the same power supply terminal as the second conductive switching element.

A sensing resistor is provided in series with the ground terminal.

SUMMARY

It is an object to provide an electrically controllable hydraulic system for a vehicle transmission allowing for a more accurate control of an actuation of a transmission element in a vehicle transmission.

It is a further object to provide a more accurate way of electrically controlling an actuation of a transmission element in a vehicle transmission.

In accordance with the above-mentioned object an improved electrically controllable hydraulic system for a vehicle transmission is provided as claimed in claim 1. The improved electrically controllable hydraulic system comprises a pressure pump system and a subsystem comprising the transmission element and an electrically controlled hydraulic pressure controlling module including a hydraulic valve element for controlling a hydraulic pressure supplied to the at least one transmission element to actuate said transmission element within an actuation range and an electromagnetically controllable operating element for operating the hydraulic valve element: Therein the subsystem has a first cutoff frequency, and the electrically controlled hydraulic pressure controlling module has a second cut-off frequency ($f2$) higher than said first cutoff frequency ($f1$).

The improved electrically controllable hydraulic system further comprises a driver circuit to provide a drive signal for controllably driving the electromagnetically controllable valve. Therein the driver circuit comprises a bridge circuit having a first supply branch and a second supply branch provided between a first power supply terminal and a second power supply terminal. Therein the first power supply terminal and the second power supply terminal define a power supply polarity. The first supply branch comprises a first controllably conductive channel of a first switching element between the first power supply terminal and a first connection node and a first unidirectional conductive element arranged between the first connection node and the second power supply terminal. The second supply branch comprises a second controllably conductive channel of a second unidirectional conductive element between the first power supply terminal and a second connection node and a second switching element between the second connection node and the second power supply terminal. The first and the second unidirectional conductive element are each arranged with their non conductive direction with respect to the power supply polarity, and the electromagnetically controllable operating element is provided as a load between said first and said second connection node to receive the drive signal.

The driver circuit is controlled by a control circuit having an input for receiving an input signal indicative for a desired value of the current to be supplied to the electrically controlled hydraulic pressure controlling module and for accordingly providing a control signal, e.g. a pulse width modulated control signal, for simultaneously controlling the first and the second switching element in a first mode wherein the switching elements are both conductive and a second mode wherein the switching elements are both non-conductive.

In this way it is achieved that the current through the electromagnetically controllable operating element of the electrically controlled hydraulic pressure controlling module is forced to decline rapidly. Therewith a substantially broader tuning range of dither frequency and amplitude is available to mitigate static friction, resulting in a more stable and accurate pressure response of the solenoid valve. Therein the control signal has a frequency and a duty cycle that corresponds to a dithered input value, being an input value of said input signal modified by a dither value, wherein the dither value varies according to a periodic function with a dither frequency in a range determined by said first frequency (f1), and said second frequency (f2). Preferably the dither frequency is in a range determined by said first frequency (f1), and said second frequency (f2) in that the dither frequency is well below the second frequency. However, the present invention is also applicable if the dither frequency does not significantly exceed the second frequency, for example if the dither frequency has a value substantially equal to the second frequency, or if the dither frequency has a slightly higher value such that the response is not lower than 5 dB of the nominal response.

In accordance with the above-mentioned further object a corresponding improved method of controlling a hydraulic system for a vehicle transmission is provided as claimed in claim 7.

In an embodiment the electrically controllable hydraulic system further comprises a sensing element for providing a sense signal indicative for an actual value of an actuation of the electrically controlled hydraulic pressure controlling module, wherein the control circuit is further configured to provide the control signal in accordance with a deviation between an actual value of said actuation as indicated by the sense signal and a desired value of said actuation as indicated by said dithered input value. In an embodiment of this embodiment the sensing element is a current sensing element arranged between the first and the second connection node in series with the electromagnetically controllable operating element of the electrically controlled hydraulic pressure controlling module. Therewith a highly accurate feedback signal is obtained to further improve the pressure response of the electrically controlled hydraulic pressure controlling module.

BRIEF DESCRIPTION OF THE DRAWINGS

These and other aspects are described in more detail with reference to the drawing. Therein.

DETAILED DESCRIPTION OF EMBODIMENTS

Like reference symbols in the various drawings indicate like elements unless otherwise indicated.

Figure 1:
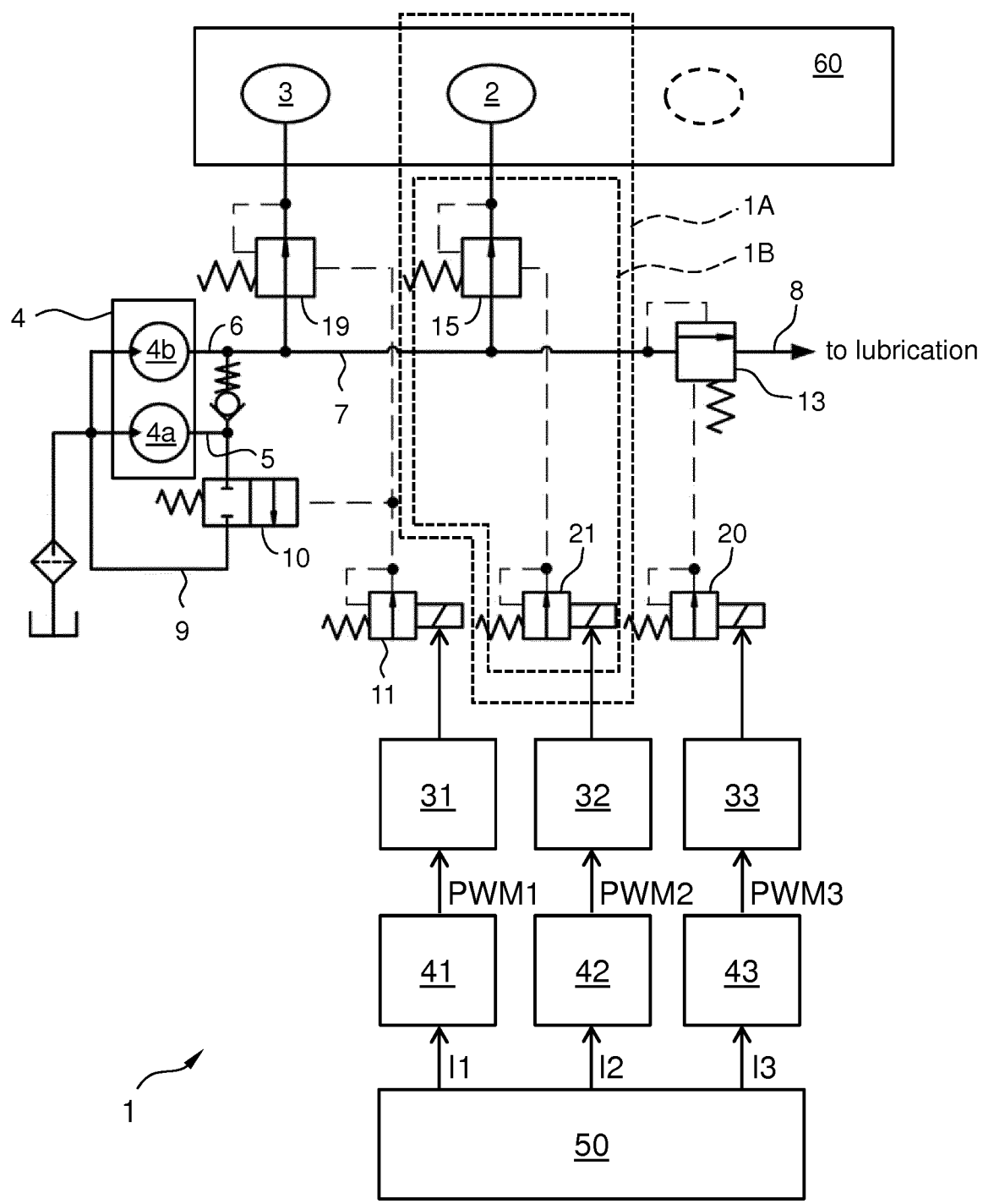
FIG. 1 illustrates an embodiment of an electrically controllable hydraulic system according to the present invention.

FIG. 1 schematically illustrates an electrically controllable hydraulic system 1 for a vehicle transmission 60 for coupling and transmitting engine power to wheels of the vehicle by actuation of at least one transmission element 2 of the vehicle transmission via the hydraulic system. Generally, a transmission provides controlled application of engine power by conversion of speed and torque from a power source, such as for example an internal combustion engine or an electrical machine. The hydraulic system may provide for actuation of friction elements in the vehicle transmission for coupling the transmission input to the geartrain to transmit engine power to the wheels of the vehicle. Such a transmission, e.g. a CVT transmission may comprise friction elements. The friction elements can be embodied as pulleys between which a flexible element such as a chain or a belt can be clamped by means of friction force in a continuous variable transmission. Alternatively the vehicle transmission 60 may provide for a stepwise adjustable transmission ratio. As shown in FIG. 1, the vehicle transmission 60 comprises at least one transmission element 2 for example a friction element, and may comprise one or more further transmission elements, e.g. a clutch 3.

In the embodiment shown the controllable hydraulic system 1 comprises a pressure pump system 4a, 4b, an electrically controlled hydraulic pressure controlling module 1B including a hydraulic actuation element 15, and an electromagnetically controllable operating element 21 for operating the hydraulic actuation element 15. The controllable hydraulic system 1 further comprises a driver circuit 32 and a control circuit 42.

In this embodiment the hydraulic system 1 comprises a pressure pump system 4 having two outlet lines 5, 6. The pressure pump system 4 can be embodied as a pump having two pump chambers, or as a two pumps each having a pump chamber, etc. Many variants are possible. Here, the pressure pump system 4 is schematically represented by two pumps 4a, 4b having outlet line 5 and 6 respectively.

The pump system 4 may be powered by the engine that also serves to provide power to the wheels of the vehicle, and pressurizes the hydraulic fluid of the hydraulic system 1. The pressurized fluid is supplied to the hydraulic system 1. The hydraulic system 1 is typically a dual system comprising a line pressure circuit 7 in which the fluid has a relatively high pressure (approximately 5-80 bar, preferably 7-70 bar) and a lubrication circuit 8 with a lower pressure (approximately 5-10 bar, preferably 6-9 bar). The lubrication circuit 8 is mainly for cooling and lubrication of components of the transmission and will not be elaborated further. It is noted that the high pressure range and the low pressure range are overlapping, but it is also noted that the high pressure is at any time higher than the low pressure, so there is no overlap of the pressure during use.

In the line pressure circuit 7, operating elements or solenoids operate valves in the line pressure circuit for controlling the pressure on components of the transmission, such as the transmission elements 2, 3, or a clutch, or the pressure in the line pressure circuit itself, etc.

In the embodiment shown, the pressure pump system 4 has two outlet lines 5, 6 which are coupled to the line pressure circuit 7. The pressure pump system 4 is further provided with a bypass circuit 9 that is controlled by a bypass valve 10. When the bypass circuit 9 is open, with bypass valve 10 open, there is flow through the bypass circuit and the output flow of the pressure system 4 is reduced. Therewith the pressure in one of the outlet lines, here outlet line 5, becomes reduced. When the bypass circuit 9 is closed, the bypass valve 10 is closed, and the output flow of one of the outlet lines, here outlet line 5, is supplied to the line pressure circuit 7. This is also referred to as the "boost" function, as the output flow of the pump system 4 then rapidly, almost immediately, increases. The bypass valve 10 is controlled by a bypass operating element 11. By providing the bypass circuit 9, the pressure and output flow of the second pump or pump chamber 4a is always available, but is not always supplied to the line pressure circuit 7. As such, when the additional pump flow is not required (no boosting), less energy is consumed from the engine.

In the line pressure circuit 7 various valves are provided for controlling pressure on components of the transmission and/or hydraulic system. There is a solenoid feed valve, not shown here, that controls the pressure on the operating elements or solenoids. A line pressure valve 13 is provided that controls the pressure in the line pressure circuit 7. An output of the line pressure valve 13 is supplied to the lubrication circuit 8 with a lubrication valve. An output of the lubrication valve typically is fed back to the pump system 4.

There is also provided a hydraulic valve element 15 for controlling the pressure on the transmission element 2. For example, the hydraulic valve element 15 may provide for a further fluid flow to a selection valve, not shown here, that controls a forward clutch and a reverse clutch. Further, a hydraulic valve element 19 is provided in the line pressure circuit 7 that controls a further transmission element 3. In an embodiment, not shown in FIG. 1, the line pressure circuit 7 also comprises a clutch valve and torque control valve, not shown here.

By controlling the pressure on the transmission element 2 the hydraulic valve element 15 actuates the transmission element 2 within an actuation range.

An electrically controlled hydraulic pressure controlling module 1B is defined by the hydraulic valve element 15 and an electromagnetically controllable operating element 21 such as a solenoid that operates the hydraulic valve element 15. Analogously, in the embodiment shown, further electromagnetically controllable operating elements 11 and 20 are provided to control further valve elements 10, 19 and 13.

The electrically controlled hydraulic pressure controlling module 1B and the transmission element 2 form a subsystem 1A with a first cutoff frequency (f1), and the electrically controlled hydraulic pressure controlling module 1B has a second cut-off frequency (f2) higher than the first cutoff frequency (f1). A cutoff frequency, also denoted as corner frequency, is defined herein as a frequency where the response of the element or subsystem is reduced to −3 dB of the nominal response.

As shown in FIG. 1 the electromagnetically controllable operating element 21 of the electrically controlled hydraulic pressure controlling module 1B is driven by a driver circuit 32, controlled by a PWM signal from control circuit 42. Likewise a respective control circuit 41, 43 and driver circuit 31, 33 are provided for electromagnetically controllable operating elements 11 and 20 of other electrically controlled hydraulic pressure controlling modules. The control circuits 41, 42, 43 are controlled by respective input signals I1, I2, I3 from a main control unit 50 indicative for a desired actuation of the corresponding transmission element of the vehicle transmission 60 and/or an element of the hydraulic system. In the sequel, the signal I2, that indicates the desired actuation of the transmission element 2, is also indicated as $I_{set}$.

Figure 2:
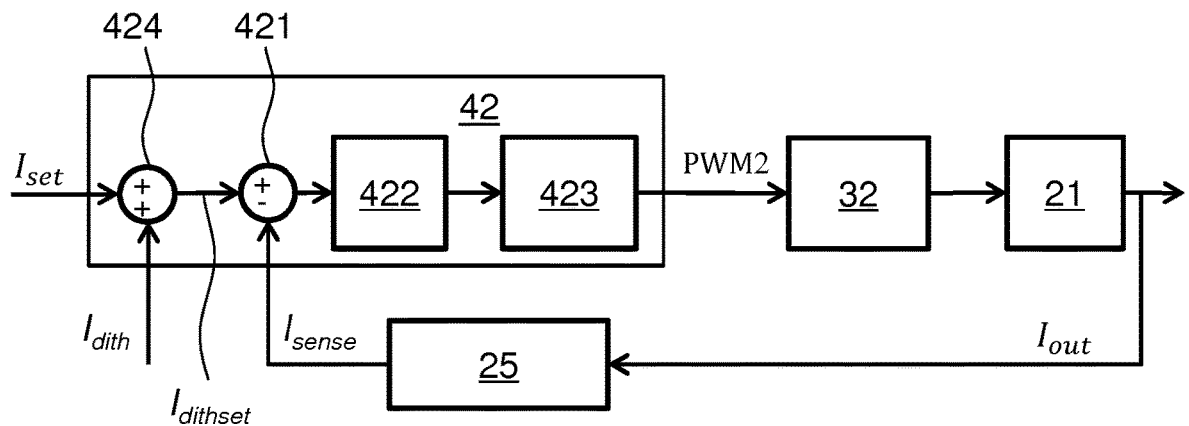
FIG. 2 illustrates a part of the electrically controllable hydraulic system in more detail.

In FIG. 2, part of the electrically controllable hydraulic system of FIG. 1 is shown, with the control circuit 42 in more detail. Similar circuitry as shown in FIG. 2 may be provided for other electromagnetically controllable operating elements, e.g. electromagnetically controllable operating elements 11 and 20.

As shown in FIG. 2, control circuit 42 has an input for receiving an input signal Iset, indicative for a desired value of the actuation of the transmission element 2. The control circuit 42 includes a modulation element 424, e.g. an adder, that modifies an input value of the input signal $I_{set}$ with a dither value (indicated by $I_{dith}$) to render a dithered input signal $I_{dithset}$. The dither value varies according to a periodic function with a dither frequency ($f_{dith}$) in a range determined by the first cutoff frequency f1 and the second cutoff frequency f2. Preferably the range for the dither frequency ($f_{dith}$) is determined in that the dither frequency ($f_{dith}$) is higher than the first cutoff frequency f1 and lower than the second cutoff frequency f2. However, embodiments may be contemplated wherein the dither frequency ($f_{dith}$) is equal to the second cutoff frequency f2 or even slightly higher than to the second cutoff frequency f2, provided that the contribution of the dither component in the driver signal is still capable to induce an oscillation of the electrically controlled hydraulic pressure controlling module 1B.

The control circuit 42 is configured for providing a control signal PWM2, e.g. a pulse width modulated control signal, for controlling the driver circuit 32 in accordance with the dithered input signal $I_{dithset}$, so as to achieve that the driver circuit 32 causes the electromagnetically controllable operating element 21 to operate the hydraulic valve element 15 with the actuation as specified by the dithered input signal. I.e. the control circuit outputs the control signal PWM2 as a periodic signal with a frequency $f_{PWM}$ and having a duty cycle that corresponds to the instantaneous value of the dithered input signal.

The dither signal $I_{dith}$ added to the input signal $I_{set}$ introduces a periodic variation relative to the desired actuation value of the transmission element 2 as indicated by the input signal $I_{set}$. Typically the PWM frequency $f_{PWM}$ is higher than both the first and the second cutoff frequency. The dither frequency, introduces a periodic variation in the actuation of the electromagnetically controllable operating element 21 and the associated hydraulic valve element 15, therewith mitigating effects of static friction. As the dither frequency (as well as the PWM frequency) is higher than the first cutoff frequency, this periodic variations do not result in disturbing vibrations of the transmission element By way of example, the PWM-frequency ($f_{PWM}$) may be 10 to 1000 times higher than the dither frequency. For example, the PWM-frequency may be in the range of 500 to 10000 Hz, and the dither frequency may be in the range of 10 to 500 Hz. Nevertheless, also a higher dither frequency e.g. up to 10 kHz may be applicable, provided that it is not significantly above the cutoff frequency of the electrically controlled hydraulic pressure controlling module, comprising a hydraulic valve element and the electromagnetically controllable operating element.

Figure 3:
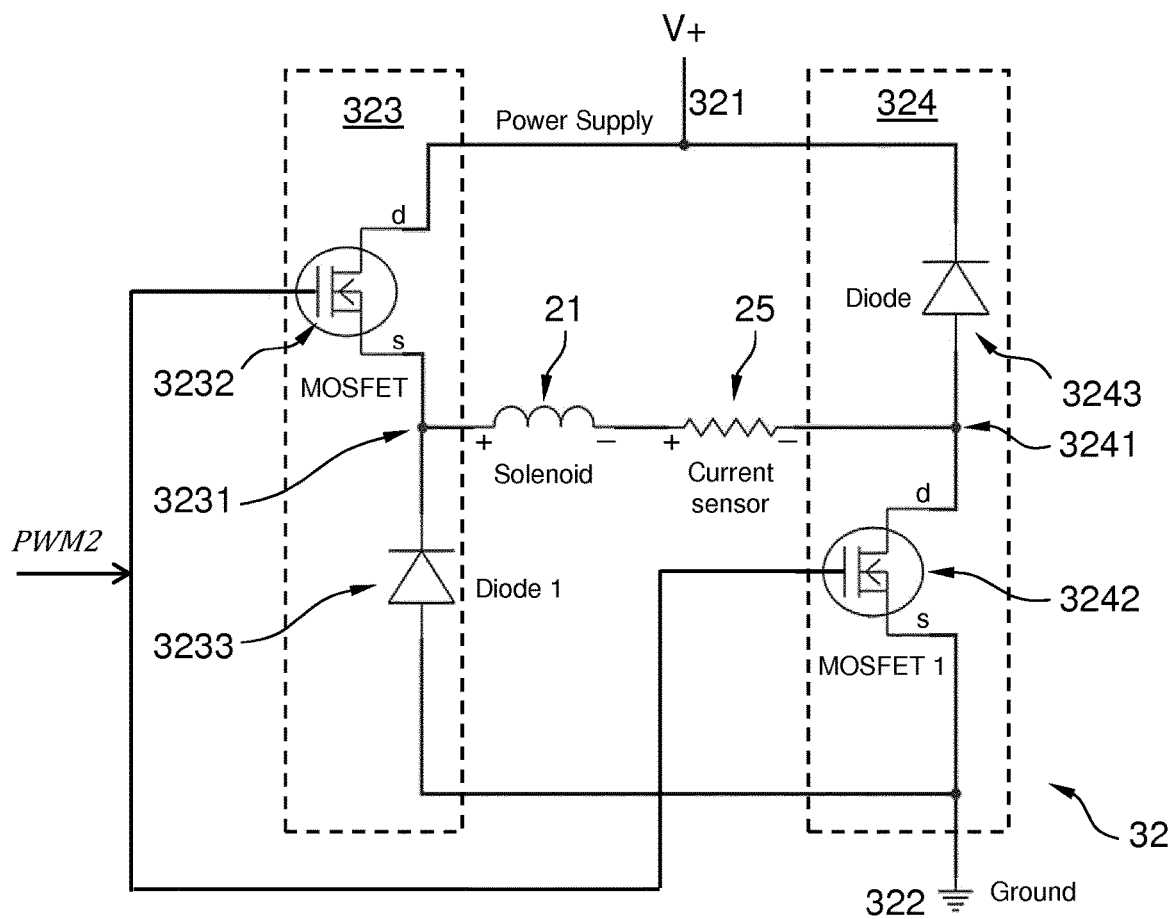
FIG. 3 illustrates a driver as used in this embodiment in more detail.

In the embodiment shown in FIG. 2, a sensing element is arranged to provide a sense signal $I_{sense}$ indicative for an actual value of the actuation of the transmission element. The control circuit 42 includes a PWM generation circuit module 423 to provide the control signal PWM2 in accordance with a deviation between an actual value of the actuation as indicated by the sense signal $I_{sense}$ and a desired value of the actuation of the electrically controlled hydraulic pressure controlling module 1B as indicated by the dithered input signal $I_{dithset}$. The sensing element may directly sense an actuation of the hydraulic valve element 15 of the electrically controlled hydraulic pressure controlling module 1B, for example by a position sensor. In an embodiment, for example as shown in FIG. 3, the sensing element 25 is a current sensing element that is arranged between the first and the second connection node 3231, 3241 in series with the electromagnetically controllable operating element of the electromagnetically controllable operating element 1B.

The control circuit 42 may be further configured to provide the control signal PWM2 in accordance with the deviation between the indicated actual value and the desired value as indicated by the dithered input signal $I_{dithset}$, for example in that it not only tends to achieve the desired value, but also tends to reduce the difference in a manner depending on a magnitude of the difference. In the embodiment shown, the control circuit 42 comprises a subtraction element 421 to determine a difference signal indicative for the deviation and an amplification circuit 422 to control the PWM generation circuit module 423. The amplification circuit 422 is for example a PID control circuit. The latter is for example implemented as software in a general purpose processor or in a dedicated signal processor or as a dedicated hardware module.

An embodiment of the driver circuit 32 of FIG. 2 is now described in more detail with reference to FIG. 3. As shown therein, the driver circuit comprises a bridge circuit having a first supply branch 323 and a second supply branch 324 provided between a first power supply terminal 321 and a second power supply terminal 322. The first power supply terminal 321 and the second power supply terminal 322 define a power supply polarity. In this case a voltage V+ having a positive polarity with respect to a Ground voltage at power supply terminal 322 is provided.

The first supply branch 323 comprises a first controllably conductive channel of a first switching element 3232 between the first power supply terminal 321 and a first connection node 3231. The first supply branch 323 further comprises a first unidirectional conductive element 3233 arranged between the first connection node 3231 and the second power supply terminal 322. The second supply branch 324 comprises a second controllably conductive channel of a second switching element 3242 between the second power supply terminal 322 and a second connection node 3241. The second supply branch 324 further comprises a second unidirectional conductive element 3243 between the second connection node 3241 and the first power supply terminal 321. The first and the second unidirectional conductive element 3233, 3243 are each arranged with their non conductive direction with respect to the power supply polarity V+/Ground and the electromagnetically controllable operating element 21 is provided as a load between said first and said second connection node 3231, 3241 to receive the drive signal.

As shown in FIG. 3, the first and the second switching element 3232, 3242 are simultaneously controlled by the control signal PWM2.

In the embodiment as shown in FIG. 3 the sensing element 25 is a current sensing element arranged in series with the electromagnetically controllable operating element 21 between the first and the second connection node 3231, 3241. Alternatively, the current sensing element may be provided that inductively senses a current through the electromagnetically controllable operating element 21. Alternatively, or in addition sensing elements may be provided that measure an actuation of the hydraulic valve element 15 of the electrically controlled hydraulic pressure controlling module 1B and/or of the transmission element 2.

FIG. 4A-D illustrates operation of a prior art driver stage wherein only one of the switching elements is switched off at a time. In the example shown dither is applied with an amplitude of 150 mA and a frequency of 75 Hz. The targeted average current is 200 mA.

Figures 4A, 4B, 4C:
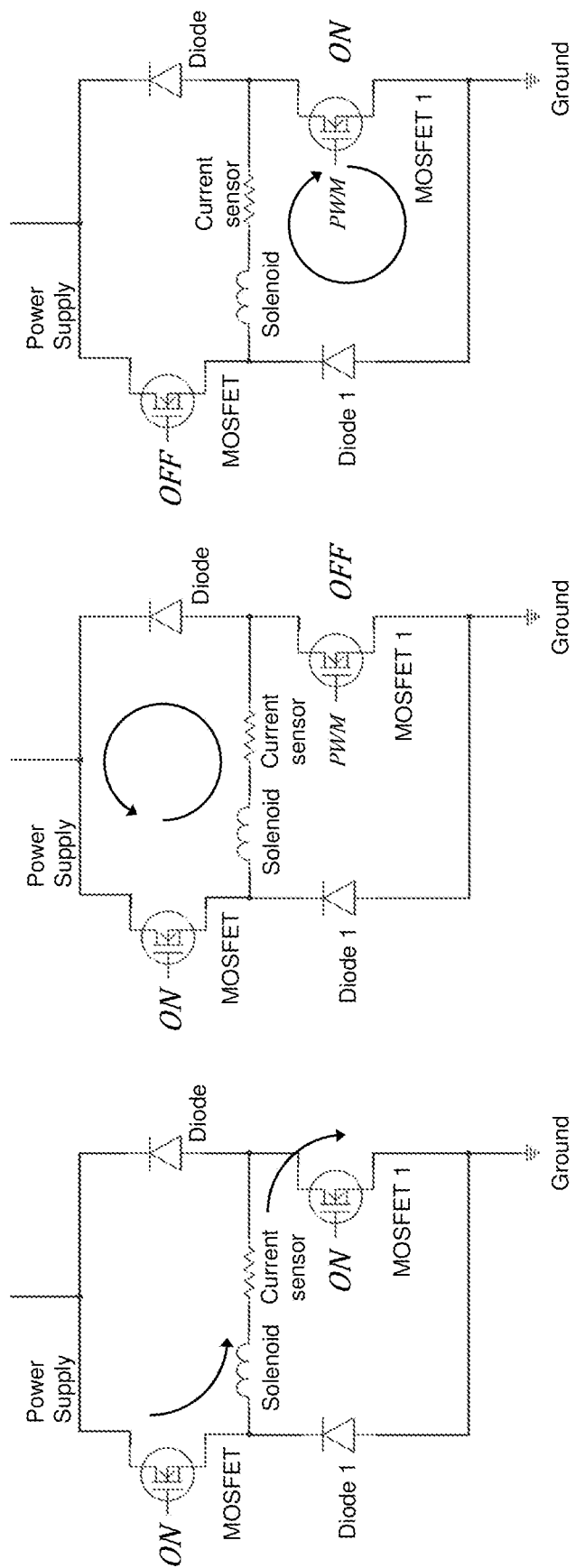
FIG. 4A-4D illustrate an operation of a electrically controllable hydraulic system according to the prior art.

Therein FIG. 4A shows a first stage of a driving cycle, wherein both switching elements are conducting, FIG. 4B shows a second stage of a driving cycle, wherein the upper one of the switching elements is conducting and the lower one is non-conducting. FIG. 4C shows a third stage of a driving cycle, wherein the lower one of the switching elements is conducting and the upper one is conducting.

Figure 4D:
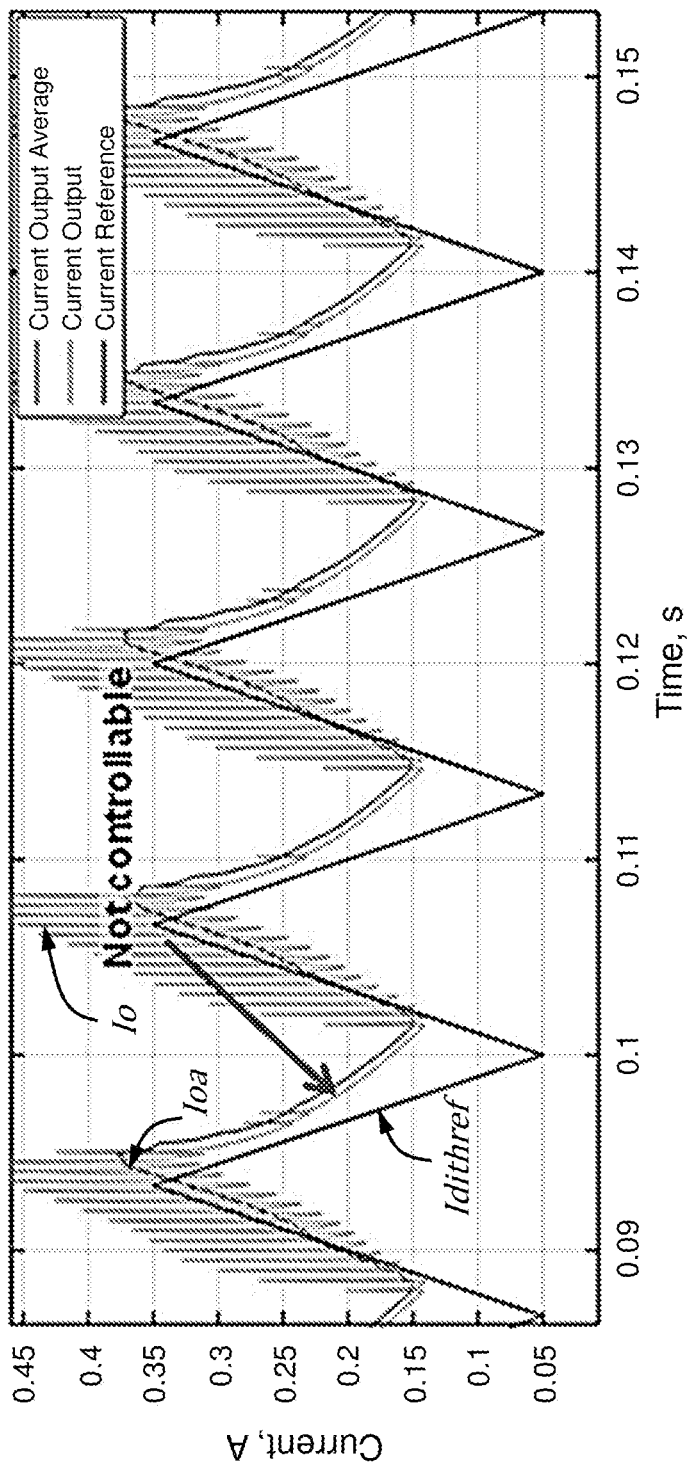

Corresponding signals are illustrated in FIG. 4D. Therein $I_{dithref}$ indicates the desired value for the current, having the targeted average value of 200 mA and including a dither to mitigate static friction. Io indicates the actual current through the electromagnetically controllable operating element 21. This signal includes a high frequency component introduced by the PWM modulation at a frequency of about 2 kHz. The average current, without the high frequency component, but including the lower frequency dither component, is denoted as Ioa. As becomes apparent from FIG. 4D, a strong deviation occurs between the desired current indicated by $I_{dithref}$ and the average current Ioa. This implies that in this known arrangement, the dithering introduces a systematic deviation. This systematic deviation resides in a relatively slow decrease of the current through the electromagnetically controllable operating element during the second and third stage of the driving cycle as is demonstrated below. Typically, the electromagnetically controllable operating element of the electrically controlled hydraulic pressure controlling module is a solenoid having inductive characteristics.

For simplicity assume that the switching elements and the diodes have ideal switching characteristics. Let the solenoid valve time constant be $\tau$ and current flowing through the solenoid just when PWM switches the mosfet ON be $I_{on}$. Then the current through solenoid during ON time is given by:

$$I(t) = I_{on}e^{-\frac{t}{\tau}} + \frac{V\text{power supply}}{R}\left(1 - e^{-\frac{t}{\tau}}\right) \qquad (1)$$

Let current flowing through the solenoid just when PWM switches the mosfet OFF be $I_{off}$. Then the current through solenoid during OFF time is given by:

$$I(t) = I_{off}e^{-\frac{R}{L}t} \qquad (2)$$

The current controller controls the duty cycle of the PWM signal to follow desired current $I_{dithref}$. However, the electrical time constant and inertia of the spool is higher for direct acting solenoid valves since the required output force is high. Using the state of the art circuit input PWM controls the voltage across solenoid between the power supply voltage and forward drop of diode ($\approx 0$). The energy stored in the solenoid winding need to discharge in the winding resistance and in diode. This gives a slower discharge path for stored energy as given in equation (2), as per equation (1) and (2) the negative slope of solenoid current is limited. If the applied dither slope exceeds this limit, the solenoid current becomes uncontrollable resulting in an average current Ioa higher than the specified current $I_{dithref}$. This enforces significant limits to the applicable dither amplitude and frequency for direct acting solenoid valves.

Figure 5B:
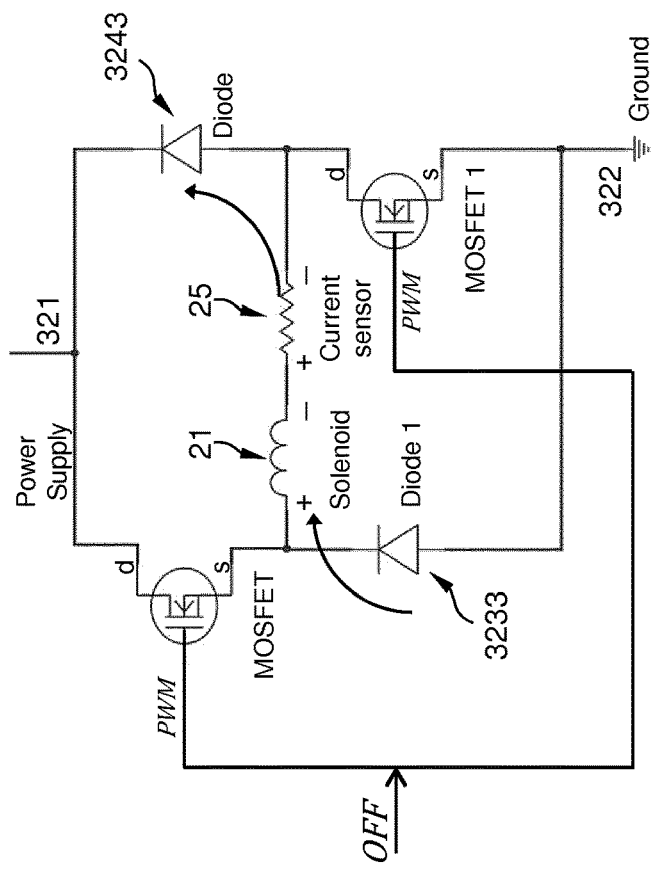
FIG. 5A-5C illustrate an operation of a electrically controllable hydraulic system of the embodiment of FIG. 1.
Figure 5A:
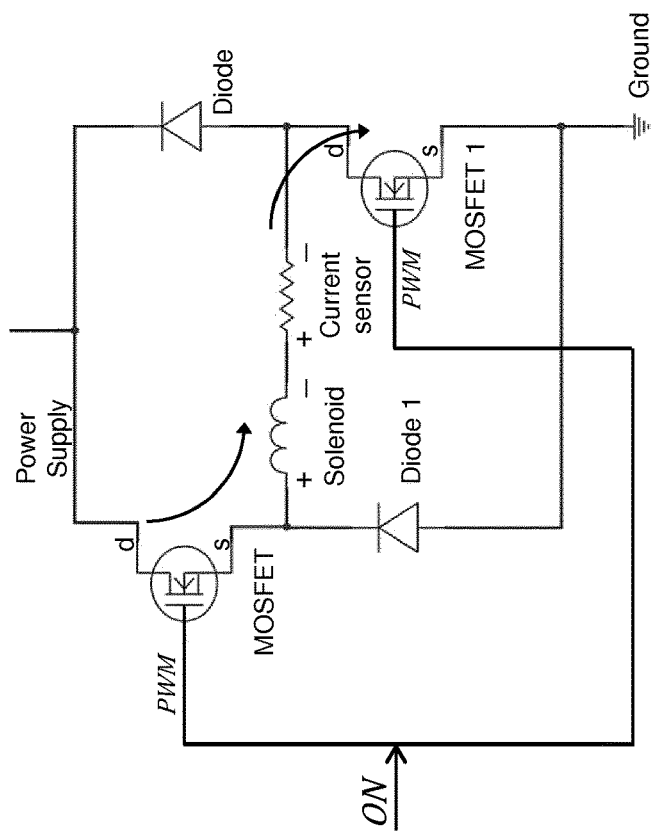
Figure 5C:
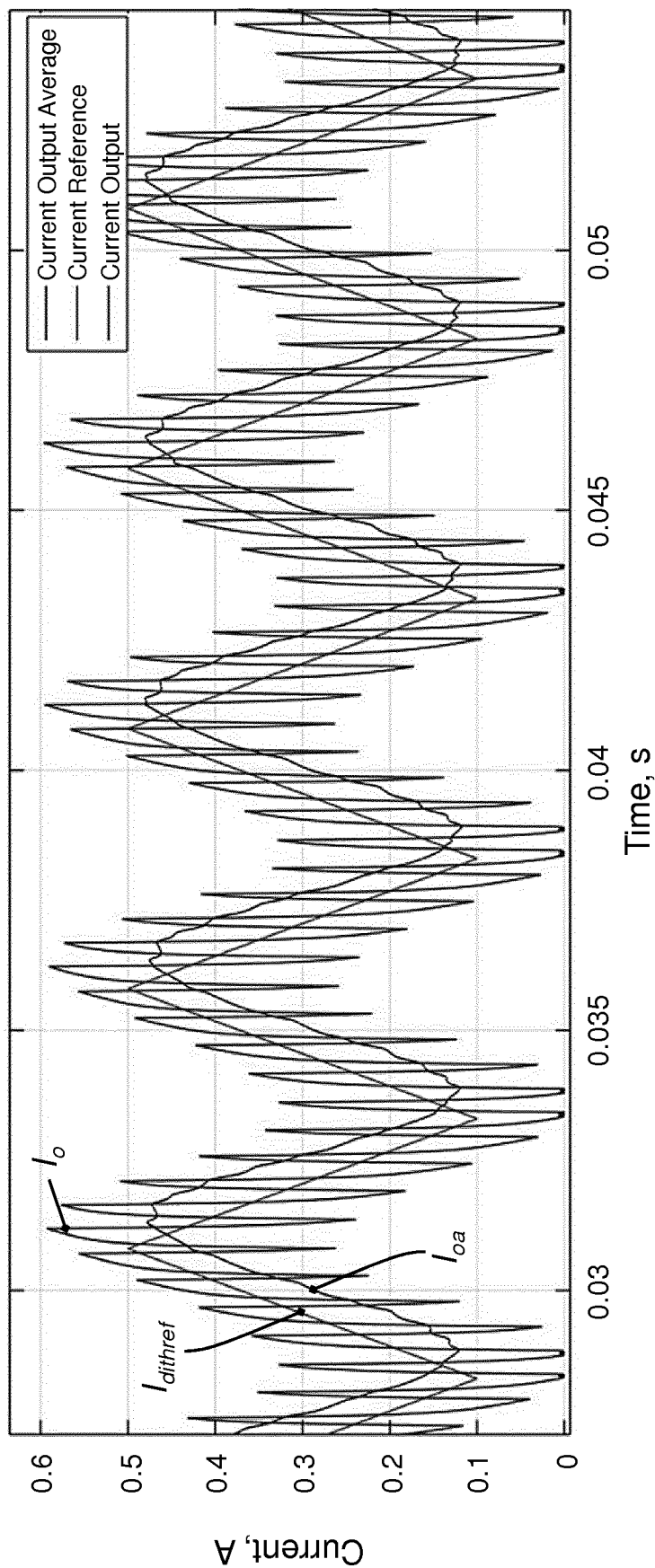

FIG. 5A-C illustrate operation of a driver in the inventive electrically controllable hydraulic system. In this example, dither is applied with an amplitude of 200 mA and a frequency of 200 Hz. The average current is 300 mA.

In the inventive system, the switching elements are simultaneously switched in a conductive state as shown in FIG. 5A and a non-conductive state as shown in FIG. 5B.

Corresponding signals are illustrated in FIG. 5C. Therein $I_{dithref}$ indicates the desired value for the current, having the targeted average value of 300 mA and including a dither to mitigate static friction. Io indicates the actual current through the electromagnetically controllable operating element 21 of the electrically controlled hydraulic pressure controlling module 1B. This signal includes the high frequency component introduced by the PWM modulation at a frequency of about 2 kHz. The average current, without the high frequency component, is denoted as Ioa. As becomes apparent from FIG. 5C, the average current Ioa closely follows the desired value $I_{dithref}$. This is achieved in that in the second stage of the driving cycle, as shown in FIG. 5B both switching elements are simultaneously in their non-conductive state. As a result, the only available current path through which the solenoid can discharge is formed by the chain comprising the unidirectional conductive element 3233, the solenoid 21, an optional current sensing element 25 and the unidirectional conductive element 3243. Therewith the supply voltage present on the terminals 321, 322 causes an active reduction of the current according to the following equation (3).

$$I(t) = I_{off} e^{-\frac{t}{\tau}} + \frac{V power \text{ supply}}{R}\left(1 - e^{-\frac{t}{\tau}}\right) \quad (3)$$

As compared to the case specified by equation (2), therewith a substantially faster reduction of the current is achieved in a dither cycle. Hence, the new electrically controllable hydraulic system provides a substantially higher tuning range of dither frequency and amplitude in order to compensate static friction. Therewith more stable and accurate pressure responses from the electrically controlled hydraulic pressure controlling module 1B can be achieved.

In particular a highly accurate pressure response is achieved in that the sensing element 25 in the electrically controllable hydraulic system is a current sensing element arranged in series with the electromagnetically controllable operating element 21 of the electrically controlled hydraulic pressure controlling module 1B between the first and the second connection node 3231, 3241. The sensing element 25 is capable to sense the current Io through the electromagnetically controllable operating element during the full driver cycle, i.e. not only in the conductive state of the switching elements 3232, 3242, but also in their non-conductive state. Therewith the average current Ioa can be determined more accurately, allowing for an even more accurate control of the transmission element by the electrically controlled hydraulic pressure controlling module 1B.

The invention claimed is:

1. An electrically controllable hydraulic system for a vehicle transmission for coupling and transmitting engine power to wheels of the vehicle by actuation of at least one transmission element of the vehicle transmission via the hydraulic system, wherein the hydraulic system comprises;
a pressure pump system;
a subsystem comprising:
the at least one transmission element;
an electrically controlled hydraulic pressure controlling module including a hydraulic valve element for controlling a hydraulic pressure supplied to the at least one transmission element to actuate said transmission element within an actuation range and an electromagnetically controllable operating element for operating the hydraulic valve element;
wherein the subsystem has a first cutoff frequency, and wherein the electrically controlled hydraulic pressure controlling module has a second cut-off frequency higher than said first cutoff frequency,
a driver circuit to provide a drive signal for controllably driving the electrically controlled hydraulic pressure controlling module, wherein the driver circuit comprises a bridge circuit having a first supply branch and a second supply branch provided between a first power supply terminal and a second power supply terminal, the first power supply terminal and the second power supply terminal defining a power supply polarity, wherein the first supply branch comprises a first controllably conductive channel of a first switching element between the first power supply terminal and a first connection node and a first unidirectional conductive element arranged between the first connection node and the second power supply terminal, and wherein the second supply branch comprises a second controllably conductive channel of a second switching element between the second power supply terminal and a second connection node and a second unidirectional conductive element between the second connection node and the first power supply terminal, and wherein the first and the second unidirectional conductive element are each arranged with their non conductive direction with respect to the power supply polarity, and wherein the electromagnetically controllable operating element is provided as a load between said first and said second connection node to receive the drive signal;
a control circuit having an input for receiving an input signal indicative for a desired value of said actuation of said transmission element and for accordingly providing a control signal for simultaneously controlling the first and the second switching element in a first mode wherein the first and second switching elements are both conductive and a second mode wherein the first and second switching elements are both non-conductive, wherein the control signal has a duty cycle that corresponds to a dithered input value, being an input value of said input signal modified by a dither value, wherein the dither value varies according to a periodic function with a dither frequency in a range determined by said first frequency, and said second frequency.

2. The electrically controllable hydraulic system according to claim 1, wherein the control signal is applied as a pulse width modulated signal having a PWM frequency higher than said second frequency.

3. The electrically controllable hydraulic system according to claim 1, further comprising a sensing element for providing a sense signal indicative for an actual value of an actuation of the hydraulic valve element of said electrically controlled hydraulic pressure controlling module, wherein the control circuit is further configured to provide the control signal in accordance with a deviation between the actual value of said actuation as indicated by the sense signal and the desired value of said actuation as indicated by said dithered input value.

4. The electrically controllable hydraulic system according to claim 3, wherein the sensing element is a current sensing element arranged between the first and the second connection node in series with the electromagnetically controllable operating element of the electrically controlled hydraulic pressure controlling module.

5. The electrically controllable hydraulic system according to claim 4, wherein the control signal is applied as a pulse width modulated signal having a PWM frequency in a range of 500 to 10000 Hz.

6. The electrically controllable hydraulic system according to claim 5, wherein the dither frequency is in a range of 10 to 10000 Hz.

7. The electrically controllable hydraulic system according to claim 4, wherein the dither frequency is in a range of 10 to 10000 Hz.

8. The electrically controllable hydraulic system according to claim 3, wherein the control signal is applied as a pulse width modulated signal having a PWM frequency in a range of 500 to 10000 Hz.

9. The electrically controllable hydraulic system according to claim 8, wherein the dither frequency is in a range of 10 to 10000 Hz.

10. The electrically controllable hydraulic system according to claim 3, wherein the dither frequency is in a range of 10 to 10000 Hz.

11. The electrically controllable hydraulic system according to claim 1, wherein the control signal is applied as a pulse width modulated signal having a PWM frequency in a range of 500 to 10000 Hz.

12. The electrically controllable hydraulic system according to claim 11, wherein the dither frequency is in a range of 10 to 10000 Hz.

13. The electrically controllable hydraulic system according to claim 1, wherein the dither frequency is in a range of 10 to 10000 Hz.

14. The electrically controllable hydraulic system according to claim 13, wherein the dither frequency is in a range of 10 to 500 Hz.

15. A method of electrically controlling a vehicle transmission for coupling and transmitting engine power to wheels of the vehicle, the system having at least one transmission element, the method being provided for said controlling by actuation of the at least one transmission element within an actuation range using an electrically controlled hydraulic pressure controlling module for actuating the at least one transmission element via a hydraulic system, the electrically controlled hydraulic pressure controlling module including a hydraulic valve element for controlling a hydraulic pressure supplied to the at least one transmission element and an electromagnetically controllable operating element for operating the hydraulic valve element;

the method comprising:
receiving an input signal indicative for a desired value of said actuation within said actuation range;
modifying said input signal by a dither value, wherein the dither value varies according to a periodic function with a dither frequency;
generating a control signal with a duty cycle that corresponds to a dithered input value, with the control signal controlling a pair of a first and a second electric switching element, the first switching element being arranged in a first electric supply branch between a first power supply terminal and a first connection node, the first electric supply branch further including a first unidirectional element between the first connection node and a second power supply terminal, the second switching element being arranged in a second electric supply branch between the second power supply terminal and a second connection node, the second electric supply branch further including a second unidirectional element between the second connection node and the first power supply terminal, wherein the first and the second unidirectional conductive element are each arranged with their non conductive direction with respect to a power supply polarity defined by said first and said second power supply terminals, the control signal determining a driving current for driving the electromagnetically controllable operating element of the electrically controlled hydraulic pressure controlling module and wherein the control signal alternately causes the first and the second switching element to simultaneously achieve their conductive mode and their non-conductive mode wherein the transmission element and the electrically controlled hydraulic pressure controlling module form a subsystem with a first cutoff frequency, wherein the electrically controlled hydraulic pressure controlling module has a second cut-off frequency higher than said first cutoff frequency and wherein the dither frequency is in a range determined by said first cutoff frequency and said second cutoff frequency.

16. The method according to claim 15, wherein the control signal is applied as a pulse width modulated signal having a PWM frequency higher than said second frequency.

17. The method according to claim 15, further comprising providing a sense signal indicative for an actual value of an actuation of the hydraulic valve element of said electrically controlled hydraulic pressure controlling module, and providing the control signal in accordance with a deviation between the actual value of said actuation as indicated by the sense signal and the desired value of said actuation as indicated by said dithered input value.

18. The method according to claim 17, wherein the sense signal is indicative for an electric current through the electromagnetically controllable operating element of the electrically controlled hydraulic pressure controlling module.

19. The method according to claim 15, wherein the control signal is applied as a pulse width modulated signal having a PWM frequency in a range of 500 to 10000 Hz.

20. The method according to claim 15, wherein the dither frequency is in a range of 10 to 10000 Hz.

* * * * *